(12) United States Patent
Harkaway et al.

(10) Patent No.: US 11,774,954 B2
(45) Date of Patent: Oct. 3, 2023

(54) SYSTEMS AND METHODS FOR WIRELESS REMOTE CONTROL OF AUTOMATED EQUIPMENT

(71) Applicant: Westinghouse Electric Company LLC, Cranberry Township, PA (US)

(72) Inventors: John S. Harkaway, Lake Bluff, IL (US); Joseph P. Amodeo, Oakbrook Terrace, IL (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 108 days.

(21) Appl. No.: 17/109,252

(22) Filed: Dec. 2, 2020

(65) Prior Publication Data

US 2022/0171378 A1    Jun. 2, 2022

(51) Int. Cl.
*G05B 23/02* (2006.01)
*G05B 15/02* (2006.01)
*H04L 69/329* (2022.01)
*H04L 67/125* (2022.01)

(52) U.S. Cl.
CPC ........ *G05B 23/0216* (2013.01); *G05B 15/02* (2013.01); *H04L 69/329* (2013.01); *H04L 67/125* (2013.01)

(58) Field of Classification Search
CPC ... G05B 23/0216; G05B 15/02; H04L 69/329; H04L 67/125; Y02E 30/00; B23K 9/028; B23K 9/0956; G21D 3/008
See application file for complete search history.

(56) References Cited

U.S. PATENT DOCUMENTS

| | | | |
|---|---|---|---|
| 6,778,097 B1 * | 8/2004 | Kajita | E02F 3/437 342/426 |
| 7,714,895 B2 | 5/2010 | Pretlove et al. | |
| 9,180,544 B2 | 11/2015 | Luck et al. | |
| 10,397,882 B2 | 8/2019 | Jiang et al. | |

(Continued)

FOREIGN PATENT DOCUMENTS

| | | |
|---|---|---|
| EP | 3131340 B1 | 8/2019 |
| JP | 2019000910 A | 1/2019 |

OTHER PUBLICATIONS

International Search Report and Written Opinion for International PCT Application No. PCT/US2021/072713, dated Mar. 18, 2022.

(Continued)

*Primary Examiner* — Tuan C Dao
(74) *Attorney, Agent, or Firm* — K&L Gates LLP

(57) ABSTRACT

Systems and methods for the remote control of automated equipment are disclosed herein. The systems and methods include automated equipment configured to execute a process in a restricted location by performing operations based on predetermined programming. In some embodiments, the process is a welding process and the restricted location is a nuclear containment building. The system and methods also include cellular routers configured to enable communication of operating parameters between the automated equipment and a human machine interface (HMI). An operator is able to remotely modify operations of the automated equipment, without being inside of or at the site of the restricted location, by changing the operating parameters using the HMI.

16 Claims, 5 Drawing Sheets

(56) References Cited

U.S. PATENT DOCUMENTS

| | | | |
|---|---|---|---|
| 11,267,068 B2 | 3/2022 | Muzilla et al. | |
| 2002/0063799 A1* | 5/2002 | Ortiz | H04N 21/6131 348/559 |
| 2002/0080967 A1* | 6/2002 | Abdo | G06F 21/85 380/270 |
| 2002/0094777 A1* | 7/2002 | Cannon | H04L 63/107 455/41.2 |
| 2002/0104833 A1* | 8/2002 | Bradley | B23K 26/0884 219/121.63 |
| 2002/0173879 A1* | 11/2002 | Sakamoto | B25J 9/1602 700/245 |
| 2005/0035717 A1* | 2/2005 | Adamson | H05B 47/155 315/150 |
| 2006/0116667 A1* | 6/2006 | Hamel | A61B 1/00059 606/1 |
| 2006/0207980 A1 | 9/2006 | Jacovetty et al. | |
| 2007/0084631 A1* | 4/2007 | Kessel | H05K 9/0003 174/371 |
| 2007/0293208 A1* | 12/2007 | Loh | H04L 12/282 455/419 |
| 2009/0113516 A1* | 4/2009 | Vorreiter | H04L 63/20 726/1 |
| 2009/0129273 A1* | 5/2009 | Zou | H04W 36/06 370/235 |
| 2009/0166034 A1* | 7/2009 | Mundell | E21B 43/12 166/250.15 |
| 2010/0062405 A1* | 3/2010 | Zboray | G09B 19/24 434/234 |
| 2011/0286567 A1* | 11/2011 | Singh | G21C 19/08 376/272 |
| 2013/0109409 A1* | 5/2013 | Ortiz | H04W 4/02 455/456.3 |
| 2014/0014637 A1 | 1/2014 | Hunt | |
| 2016/0100371 A1* | 4/2016 | Jiang | H04W 52/246 455/522 |
| 2016/0189811 A1 | 6/2016 | Pottorf et al. | |
| 2016/0260261 A1 | 9/2016 | Hsu | |
| 2017/0070963 A1* | 3/2017 | Jiang | H04W 48/04 |
| 2017/0232615 A1 | 8/2017 | Hammock | |
| 2018/0359214 A1* | 12/2018 | Janneteau | H04L 61/256 |
| 2020/0192320 A1 | 6/2020 | Stagg | |
| 2021/0045301 A1* | 2/2021 | Shakoor | A01B 79/005 |
| 2021/0046569 A1 | 2/2021 | Singh et al. | |
| 2021/0329534 A1* | 10/2021 | Szrom | H04W 48/04 |

OTHER PUBLICATIONS

Search Report for Taiwan Application No. 110145022, dated Sep. 19. 2022.

* cited by examiner

SYSTEMS AND METHODS FOR WIRELESS REMOTE CONTROL OF AUTOMATED EQUIPMENT

In industrial environments, access to equipment requiring maintenance or repair is often limited. For example, human access to certain locations within a plant may be restricted due to hazards such as radiation or other contaminants. Similarly, it may be impossible for a human to access and work on certain plant equipment due to space or clearance restrictions.

Nuclear plants comprise a containment building where human access is especially restricted. This is because the containment building houses what are commonly referred to as the "nuclear island" components and is where the hazardous radiological elements of the nuclear plant are located. These components include, for example, the nuclear reactor. As the nuclear fuel used in the nuclear reactor has reached its purposeful life, it is removed from the reactor and moved to a spent fuel pool located within the containment building. Upon reaching a certain capacity, regulations and standard practice require the spent fuel pool to be emptied of spent nuclear fuel that has accumulated. Timely removal of the spent fuel is critical because it ensures that the spent fuel pool has excess capacity in case nuclear fuel needs to quickly be removed from the reactor.

To safely and efficiently remove the spent fuel from the containment building, it is placed in a specially-designed containment canister. And to ensure radiation from the spent fuel is properly contained, it is sealed by welding a lid to the top of the canister. However, this welding process is difficult because human access to the containment building is restricted. Moreover, as discussed above, the spent fuel emits radiation that is unsafe for plant personnel.

It is the goal of the present disclosure to provide systems and methods that offer a safer, more effective, and lower cost way to allow for the human assisted control of automated equipment in restricted locations, including human assisted control of automated welding processes at nuclear facilities, using wireless communications.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a system for the remote control of automated equipment is disclosed. The system includes: automated equipment configured to execute a process in a restricted location by performing operations based on predetermined programming; a first cellular router communicatively coupled to the automated equipment, wherein the first cellular router is located outside of the restricted location; a second cellular router configured to communicate with the first cellular router using a cellular network, wherein the second cellular router is located remotely from the first cellular router; an operator console communicatively coupled to the second cellular router, the operator console comprising a human machine interface (HMI) that enables an operator to modify the operations of the automated equipment in real time by changing operating parameters of the predetermined programming, wherein the changing the of the operating parameters is communicated between the operator console and the automated equipment; wherein a wireless signal cannot be transmitted from within the restricted location to outside of the restricted location.

In various aspects, a system for the remote control of a robot weld head is disclosed. The system includes: a robot weld head configured to weld a lid on a spent fuel canister located within a containment building of a nuclear plant by performing welding operations based on predetermined programming; a first cellular router communicatively coupled to the robot weld head, wherein the first cellular router is located outside of the containment building; a second cellular router configured to communicate with the first cellular router using a cellular network, wherein the second cellular router is located remotely from the first cellular router; an operator console communicatively coupled to the second cellular router, the operator console comprising a human machine interface (HMI) that enables an operator to modify the welding operations of the robot weld head in real time by changing operating parameters of the predetermined programming, wherein the changing the of the operating parameters is communicated between the operator console and the robot weld head; wherein a wireless signal cannot be transmitted from within the containment building to outside of the containment building.

In various aspects, a method for the remote control of automated equipment is disclosed. The method includes: executing a process in a restricted location using automated equipment configured to perform operations based on predetermined programming; communicating operating parameters of the predetermined programming between an operating console and the automated equipment, the operating console comprising a Human Machine Interface (HMI); wherein a first cellular router is communicatively coupled to the automated equipment, the first cellular router located outside of the restricted location; wherein a second cellular router is communicatively coupled to the operating console, the second cellular router located remotely from the first cellular router; wherein a wireless signal cannot be transmitted from within the restricted location to outside of the restricted location; and wherein the first cellular router is configured to communicate with the second cellular router using a cellular network; and modifying, by an operator using the HMI, the operations of the automated equipment in real time by changing the operating parameters that are communicated between the operator console and the automated equipment.

In various aspects, a method for the remote control of a robot weld head is disclosed. The method includes: welding a lid on a spent fuel canister located within a containment building of a nuclear plan using a robot weld head configured to perform welding operations based on predetermined programming; communicating operating parameters of the predetermined programming between an operating console and the robot weld head, the operating console comprising an HMI; wherein a first cellular router is communicatively coupled to the robot weld head, the first cellular router located outside of the containment building; wherein a second cellular router is communicatively coupled to the operating console, the second cellular router located remotely from the first cellular router; wherein a wireless signal cannot be transmitted from within the containment building to outside of the containment building; and wherein the first cellular router is configured to communicate with the second cellular router using a cellular network; and modifying, by an operator using the HMI, the welding operations of the robot weld head in real time by changing the operating parameters that are communicated between the operator console and the robot weld head.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Figure 1:
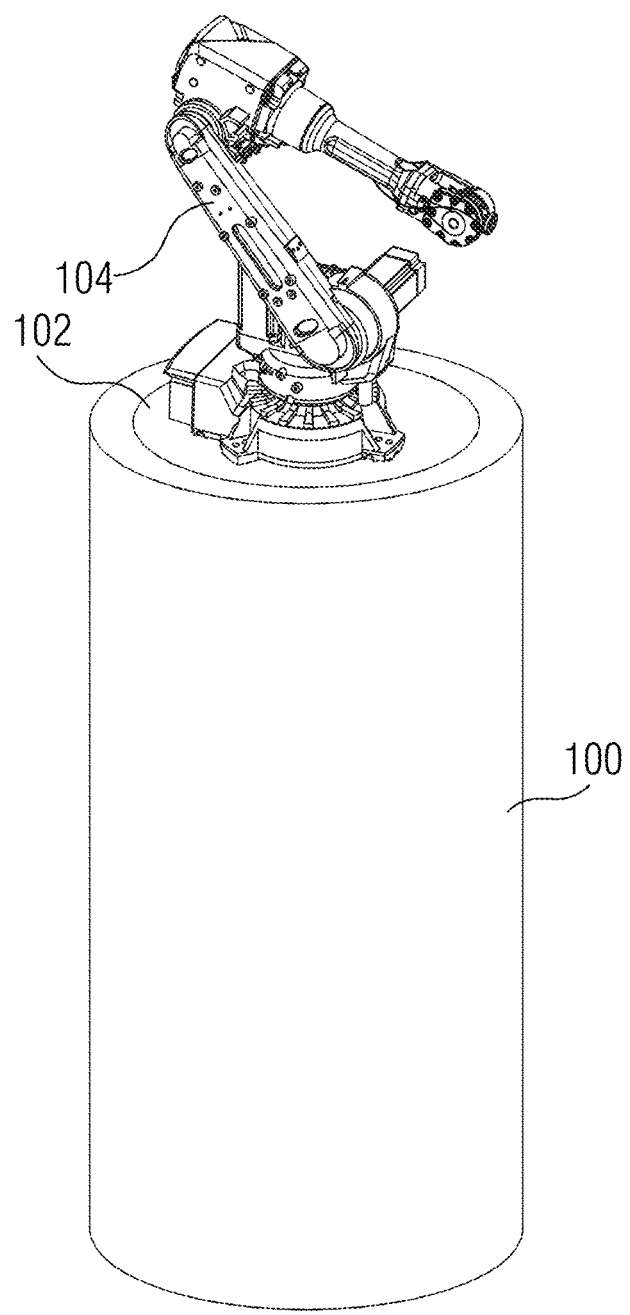
FIG. 1 illustrates a perspective view of a spent fuel canister and a robot weld head attached to a fuel canister lid, in accordance with at least one non-limiting aspect of the present disclosure.

Corresponding reference characters indicate corresponding parts throughout the several views. The exemplifications set out herein illustrate various aspects of the present disclosure, in one form, and such exemplifications are not to be construed as limiting the scope of the present disclosure in any manner.

DETAILED DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims.

Before explaining various aspects of the present disclosure in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

The present disclosure is directed to systems and methods for the human assisted control of automated equipment in restricted locations, including human assisted control of automated welding processes at nuclear facilities, using wireless communications. Automated equipment is often used in industrial environments to perform maintenance or repair operations where access is limited due to safety or clearance restrictions. For example, access to the containment building of a nuclear power plant is restricted due to hazards such as radiation and other contaminants. Although operations occurring within these restricted locations may be performed using automated equipment carrying out a predetermined program, human intervention is often required to control and adjust critical aspects of the otherwise automated process. Enabling this human control is difficult because transmitting wireless signals into and out of the restricted location may not be possible. For example, the walls of a nuclear containment building may be constructed of 6 ft. thick cement thereby preventing the transmission of wireless signals. Accordingly, there is a need for systems and methods that enable the human assisted control of automated equipment in restricted locations using wireless communications.

One such automated process requiring human assisted control is welding the lid on a spent nuclear fuel canister using an automated robot weld head. To perform this process, an automated robot welding arm is mounted to the lid of the spent fuel canister to perform the welding process. For example, FIG. 1 illustrates a spent fuel canister 100 and a canister lid 102. Mounted on canister lid 102 is a robot weld head 104 that welds canister lid 102 to the top of spent fuel canister 100. Although the use of an automated welding robot allows for the canister to be sealed without a human being present in the containment area, human intervention is still required to make critical decisions throughout the welding process. Specifically, a human operator is needed to monitor weld puddle characteristics, sidewall fusion, and welding arc characteristics and to make on-the-fly adjustments as necessary. These adjustments may be implemented, for example, by manipulating the weld wire (manipulating filler wire entry into the weld puddle) to achieve the desired weld puddle characteristics and modifying the tungsten positioning in order to maintain the desired arc penetration and weld deposition. The operating parameter changes that are needed to modify these welding operations cannot be predetermined and require control and correction based on live human monitoring in order to meet canister lid welding requirements.

The canister lid welding process is further complicated because communications between the human operator control station and the robot weld arm typically require a hard-wired connection. This is because wireless communication signals cannot pass through the thick, cement walls of the containment building.

Another difficult aspect of the canister lid welding process is that the human-assisted control of the robot welding arm must be performed by a skilled operator. And because communication between the robot welding arm and the operator is limited to a hard-wired connection, the skilled operator charged with welding the canister lid must be physically present at the plant location. This creates cost and personnel issues because the number of skilled operators available may be limited. For example, companies may not have sufficient manpower to execute multiple spent fuel removal jobs occurring simultaneously at multiple plant locations. As a result, companies are faced with increased costs associated with frequent training of new operators. Additionally, deploying multiple skilled operators to each physical plant location necessitates additional travel and living expenses.

By enabling the human assisted control of automated equipment in restricted locations using wireless communications, the various systems and methods disclosed herein beneficially improve the safety, cost effectiveness, and efficiency of equipment operations. For example, enabling the human assisted control of spent fuel canister welding operations using wireless communications beneficially reduces the risk of injury to human operators by enabling them to work from outside of the hazardous containment area. Specifically, operators can make adjustments to critical welding parameters requiring human oversight without being exposed to radiation and other contaminants. Embodiments of the present disclosure also improve safety by reducing operator fatigue associated with working in restricted or hazardous locations.

Moreover, there are numerous cost saving benefits associated with enabling the remote control of automated equipment using wireless technology. For example, because operators are not required to be physically located at the job location, they may work out of centralized locations. This beneficially enables a team of skilled operators in a single location to remotely control equipment at multiple jobsites. As a result, the number of workers required at each jobsite is minimized and overhead costs associated with travel and living expenses are reduced. Aspects of the present disclosure also enable operators to work from a home office.

Allowing operators to control automated equipment remotely also beneficially reduces training costs. For example, skilled operators are required to control the spent nuclear fuel canister welding process. The systems and methods disclosed herein avoid costs associated with training new skilled operators who would otherwise be needed to execute multiple spent fuel removal jobs occurring simultaneously at multiple plant locations. Further, aspects of the present disclosure enable seasoned welders to continue to weld by avoiding strenuous travel requirements.

Current aspects of the present disclosure also beneficially improve the efficiency of automated processes in several respects. For example, by enabling automated processes occurring in restricted locations to be controlled remotely, operators can adjust and manipulate these processes in "real time" from any location. Additionally, operators can download operating parameters, schedules, error logs, and diagnostic information which enables remote troubleshooting. The present disclosure also allows the software controlling the automated processes to be updated and customized remotely without requiring a subject matter expert to be physically present at the equipment location. Efficiency is further improved because the same set of skilled operators are able to monitor operations at multiple jobsites from a single location, thereby enhancing work quality and consistency.

Referring to FIG. 1, a perspective view of a spent fuel canister 100 is depicted in accordance with at least one non-limiting aspect of the present disclosure. As nuclear fuel used in a nuclear reactor reaches the end of its purposeful life it is moved to a spent fuel pool. Both the nuclear reactor and the spent fuel pool are housed in the containment building of the nuclear plant. As the spent fuel pool reaches its maximum capacity, spent nuclear fuel is transported outside of the containment building by placing the spent nuclear fuel within spent fuel canister 100.

In further reference to FIG. 1, canister lid 102 is used to cap the spent fuel canister 100 and safely prevent radiation emitted by the spent nuclear fuel from escaping. A seal is created by welding canister lid 102 to spent fuel canister 100 using robot weld head 104. Specifically, robot weld head 104 performs various welding operations such as: positioning and moving the robot arm, feeding and positioning welding (filler) wire, and positioning the tungsten that controls the weld arc. The welding operations performed by robot weld head 100 may be automated based on predetermined programming executed by a robot controller and/or programmable logic controller. Although these operations are automated, human intervention is required to ensure that the spent fuel canister is safely sealed. For example, human intuition and experience is needed to monitor the weld puddle and sidewall fusion and to make necessary adjustments to parameters controlling the filler wire positioning and feed rate. Similarly, human intuition and experience is needed to monitor the weld arc and make necessary adjustments to parameters controlling tungsten positioning in order to ensure proper weld penetration and deposition. However, human control of these operations is difficult because access to the containment building is restricted because of its hazardous radiological environment.

Figure 2A:
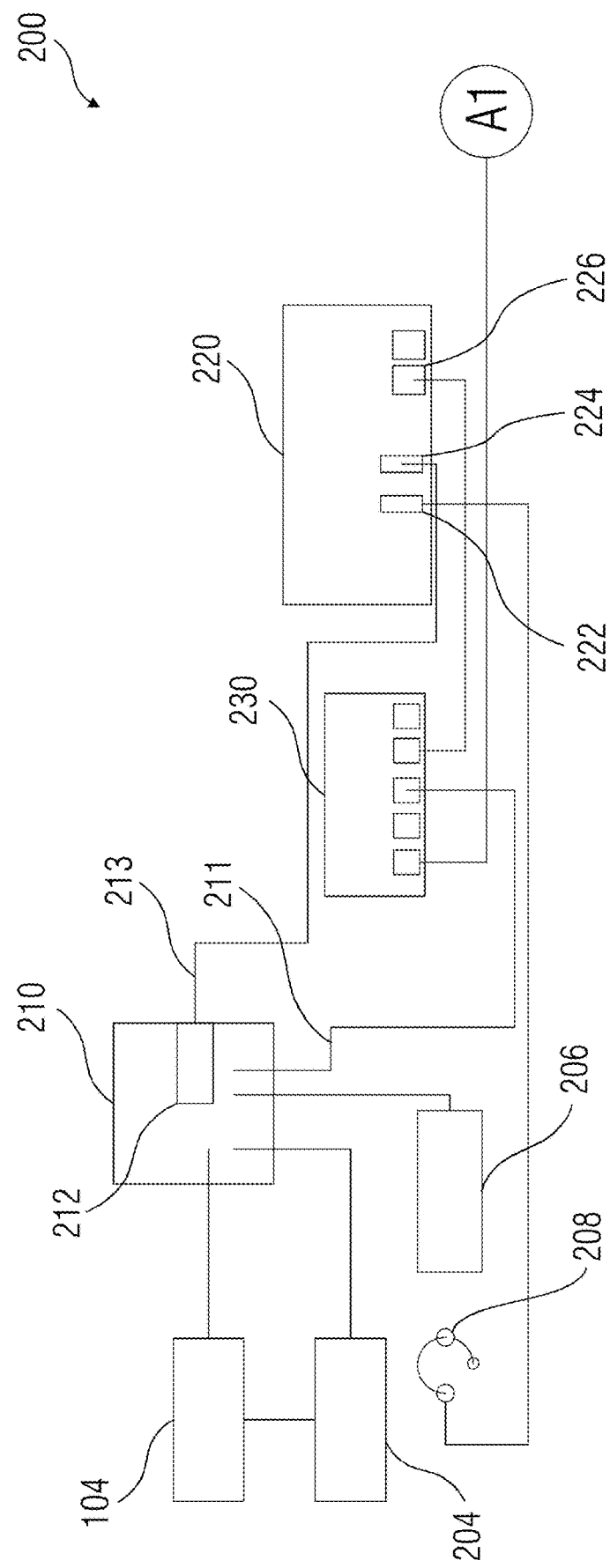
FIG. 2A and FIG. 2B illustrate a block diagram of a work station configured for wireless control of automated equipment, in accordance with at least one non-limiting aspect of the present disclosure.
Figure 2B:
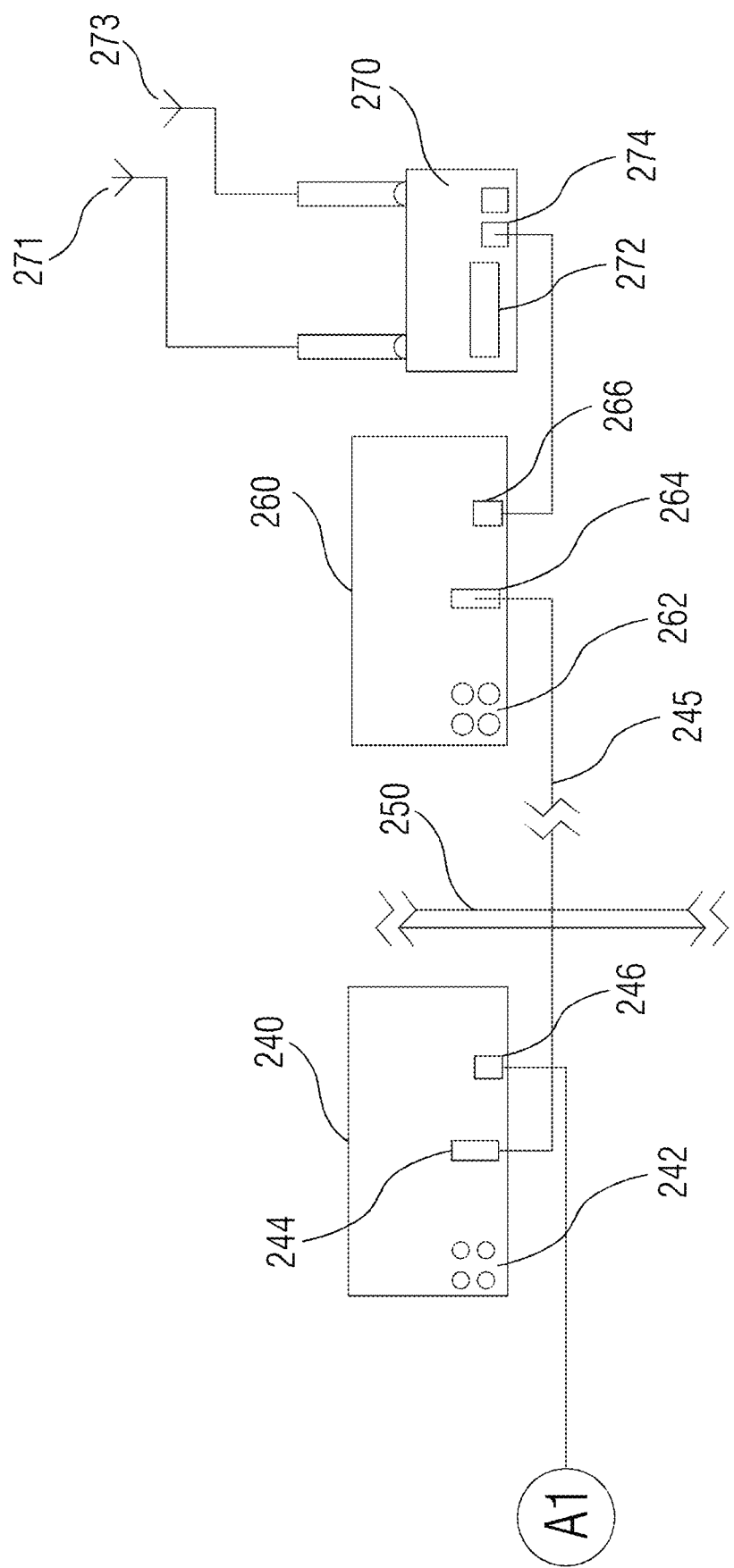

Referring now to FIG. 2A and FIG. 2B, a block diagram of work station 200 configured for wireless control of automated equipment is depicted in accordance with at least one non-limiting aspect of the present disclosure. FIGS. 2A and 2B are intended to be viewed together. FIG. 2A joins with FIG. 2B as indicated by connection point A1. First referring to FIG. 2A, work station 200 includes robot weld head 104. As described above, robot weld head 104 may be configured to execute a welding process based on predetermined programming. This predetermined programming may be stored within and/or executed by a robot controller 204 that is communicatively coupled to robot weld head 104. Work station 200 further includes welding power supply 206. Welding power supply 206 may be computer controlled and configured to regulate the power supplied to robot weld head 104.

In other embodiments of the present disclosure, work station 200 may include automated equipment in place of robot weld head 104. For example, the systems and processes described herein may be applied to control automated equipment used for industrial processes such as welding, painting, assembly, material handling, pick and place, packaging, labeling, palletizing, product inspection, testing, and other processes that use a robotic arm to perform autonomous tasks. The systems and processes described herein beneficially enable the human assisted wireless remote control of these processes when performed in restricted areas.

Returning to FIG. 2A, work station 200 further includes programmable logic controller (PLC) 210. PLC 210 is configured to enable communication of robot weld head 104, robot controller 202, and welding power supply 206 with other components of work station 200 via ethernet. For example PLC 210 may include various input and output channels associated with different components of robot weld heat 104, robot controller 204, and welding power supply 206. Using these input and output channels, PLC 210 is able to both send signals controlling the operation of robot weld head 104 as well as receive signals related to the operational status of robot weld head 104. PLC 210 translates these signals to an Ethernet-based protocol for communication with other components of work station 200 via Ethernet cable 211. PLC 210 may also be coupled to welding power supply 206 and be configured to provide power to robot weld head 104.

In addition to the various input and output signals communicated between robot weld head 104 and PLC 210, robot weld head 104 may also communicate one or more video signals to PLC 210. In various embodiments, robot weld head 104 may include one or more cameras configured to monitor the weld process and generate a video signal based on the captured images. For example, it may be desirable to have one camera monitoring the leading edge of the weld puddle and one camera monitoring the trailing edge of the weld puddle. Live video based on these cameras enable a skilled operator to, for example, monitor the weld puddle, sidewall fusion, filler wire entry position and speed, and/or arc characteristics related to the penetration and deposition of the weld. Further, based on the live video, a skilled operator may, for example, make critical adjustments to parameters controlling the filler wire feed rate, filler wire positioning, tungsten positioning, and/or the speed and positioning of the weld arm in order to correct and improve the quality of the weld and to reduce the risk of defect.

In various embodiments of the present disclosure, the one or more cameras used to monitor the weld process may use arc-filtering technology to allow for a clear view the weld puddle without significant obstruction by the weld arc. To accomplish this, the one or more cameras may filter out light with a frequency matching the frequency of light emitted by the weld arc. By generating a high-resolution, "real time" image, the operator is beneficially able to make informed decisions related to controlling operating parameters of the automated equipment. The term "real time" as it is used in the present disclosure generally describes the ability to view or perceive operations and operating parameters of the automated equipment instantaneously, nearly instantaneously, or with low latency. Displaying real time video is critical for allowing the operator to view adjustments he or she is making to the operation of the automated equipment while they are being implemented. For example, by displaying this real time video for the operator, the operator is beneficially able to monitor the weld puddle, weld arc, and/or the position of the robot arm and make instantaneous or nearly instantaneous adjustments. As described above, in other embodiments of the present disclosure, work station 200 may include alternate automated equipment in place of robot weld head 104. This alternate equipment may similarly include one or more cameras that generate a signal that is transmitted to PLC 210.

Referring again to FIG. 2A, PLC 210 receives the video signal from each of the one or more cameras and, via a video switcher 212, transmits the video signal to video encoder 220. The video signal may be transmitted from video switcher 212 to video encoder 220 via cable 213 using a serial digital interface (SDI) format and is received by video encoder 220 at SDI input 224. Work station 202 may further include a headset 208 that captures audio related to the automated process and generates an audio signal that is transmitted directly to audio connection 222 of video encoder 220. Additionally, headset 208 may include both a microphone and speakers that are configured to be worn by an operator located at the work station 200 location. Video encoder 220 receives the video signal from video switcher 212 and/or the audio signal from headset 208 and, without loss of quality, converts these signals to be transmitted to other components of work station 200 via LAN connection 226 using an Ethernet-based protocol.

Work station 200 further includes LAN router 230 which is communicatively coupled to both PCL 210 and video encoder 220. LAN router 230 is configured to route communication between different components of work station 200 by detecting each component's individual IP address. LAN router 230 may be implemented using an UNMS EdgeRouter or similar Ethernet router technology. In the embodiment disclosed in FIG. 2, LAN router 230 is configured to route Ethernet signals from PLC 210 and video encoder 220 to fiber optic receiver 240.

Referring now to FIG. 2B, fiber optic receiver 240 is configured to accept Ethernet signals from LAN router 230 via Ethernet connection 246 and transmit those signals from single mode connection 244 via single mode fiber 245 to fiber optic transmitter 260. Fiber optic transmitter may also include video input 262. The fiber optic connection between fiber optic receiver 240 and fiber optic transmitter beneficially enables communication from within the restricted area of an industrial environment to outside of the restricted area without the need for wireless communication. For example, FIG. 2 depicts PLC 210, video encoder 220, LAN router 230, and fiber optic receiver 240 as housed within the containment building of a nuclear power plant, designated by their placement to the left of containment structure wall 250. Further, FIG. 2 depicts single mode fiber 245 spanning across containment structure wall 250 and enabling communication with fiber optic transmitter 260, which is located outside of the containment building. In this example, single mode fiber 245 may extend up to approximately 2 miles in length without losing signal quality or speed, allowing fiber optic transmitter 260 and cellular router 270 to be located well outside the containment building if required.

Fiber optic transmitter 260 receives signals from fiber optic receiver 240 at single mode connection 264. and converts those signals back to an Ethernet format for further transmission to work station cellular router 270 via Ethernet connection 266. As a result, work station cellular router 270 receives data related to robot weld head 104 (including any data from cameras mounted on robot weld head 104), robot controller 204, weld power supply 206, and headset 208 via LAN connection 274. Further, using high gain antennas 271 and 273, work station cellular router 270 is configured to send and receive data related to robot weld head 104, robot controller 204, weld power supply 206, and headset 208 via cellular communication to a remotely located operator station cellular router 370, as depicted in FIG. 3B.

Cellular routers 270 and 370 are configured to enable wireless communication of data related to the operation of robot weld head 104 using a secure cellular network connection. In various embodiments of the present disclosure, the cellular routers are able to detect the signal strength of cellular networks from multiple network providers. The signal strength may be displayed on signal strength indicators 272 and 372. Further, the cellular routers 270 and 370 may be programmed to select and utilize a preferred cellular network. Alternatively, cellular routers 270 and 370 may be programmed to automatically select the cellular network with the strongest combined signal, or strongest signal at either of the individual router locations. Yet further, cellular routers 270 and 370 may be configured to allow for connection to multiple cellular networks concurrently to improve bandwidth reliability and effectively increase the data transfer throughput.

Cellular routers 270 and 370 may be further configured to automatically switch cellular networks in the case of a signal loss with the initial or preferred network. This beneficially allows critical operator control of the robot weld head 104 or other automated equipment to continue in the case of a signal loss. Further, cellular routers 270 and 370 may be programmed to continue using the alternate cellular network when connection with the initial or preferred network is reestablished. Alternatively, cellular routers 270 and 370 may be programmed to switch back to the initial or preferred network. Cellular routers 270 and 370 may be implemented using Cradlepoint or similar cellular router technology.

In the case of a complete signal loss among all available cellular networks, robot weld head 104 and/or robot controller 204 may be configured to safely pause operations. This may be implemented using a watchdog timer that detects the signal interruption and triggers the robot weld head 104 to automatically downslope and maintain a safe state. Alternately, the work site location may be equipped with a local operator station. In this case, a watchdog timer may be used to detect a signal loss that then causes control to switch from the remote operator station to a local operator station where an onsite operator can continue welding operations. A second watchdog timer may be implemented that causes the robot weld head 104 to automatically downslope and maintain a safe state if no onsite operator establishes control of the local operator station.

Figure 3A:
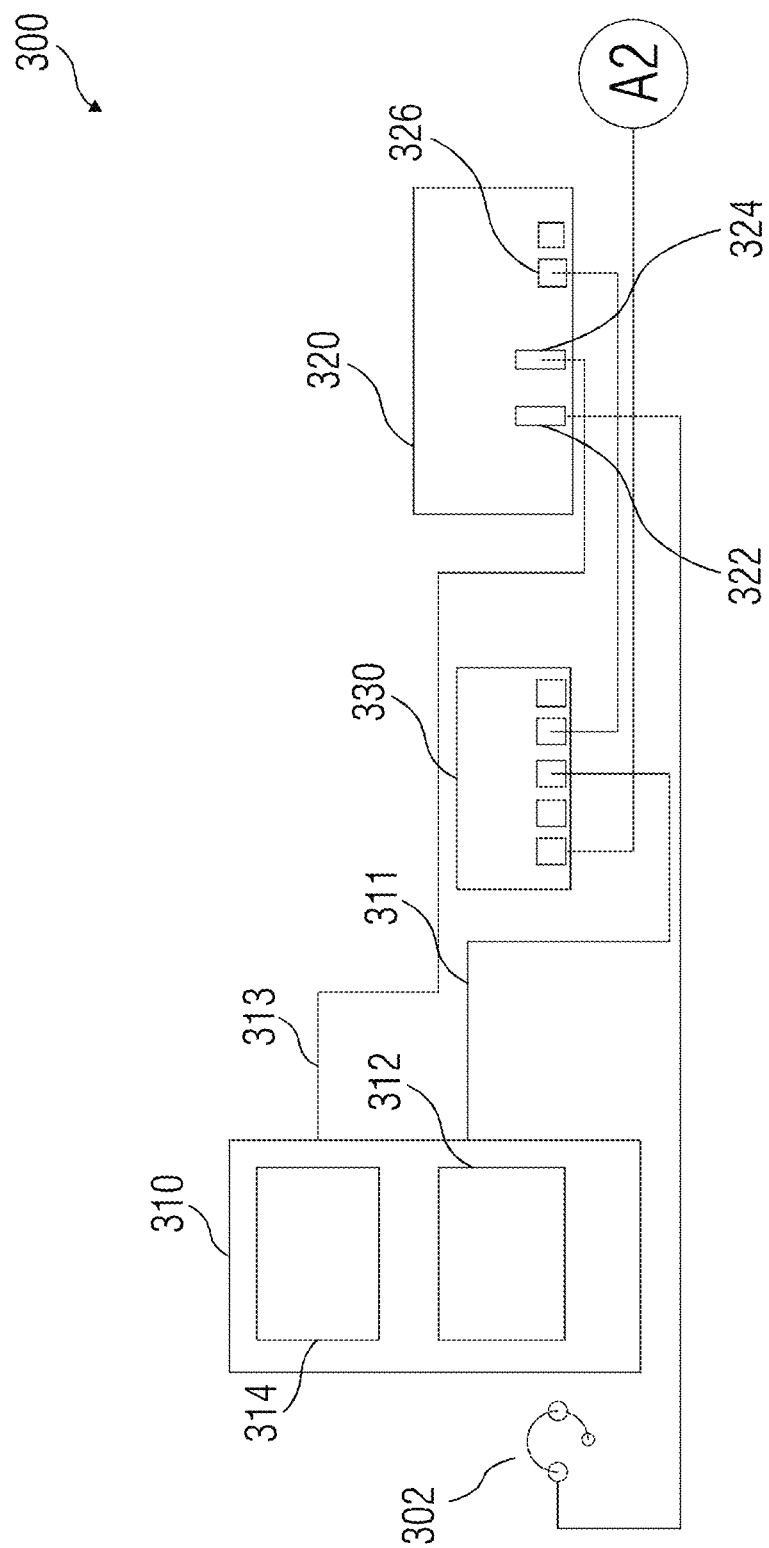
FIG. 3A and FIG. 3B illustrate a block diagram of an operator station configured for wireless control of automated equipment, in accordance with at least one non-limiting aspect of the present disclosure.
Figure 3B:
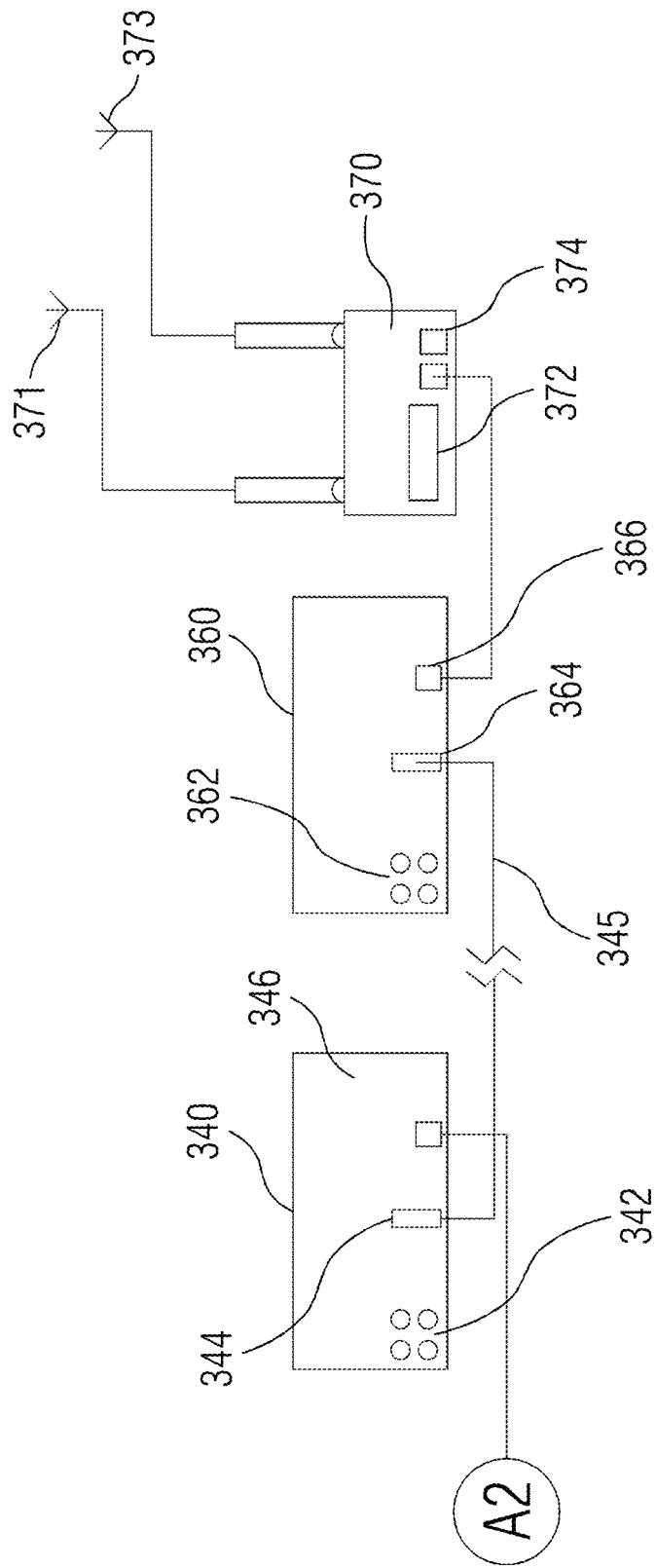

Referring now to FIG. 3A and FIG. 3B, a block diagram of operator station 300 configured for wireless control of automated equipment is depicted in accordance with at least one non-limiting aspect of the present disclosure. FIG. 3A and FIG. 3B are intended to be viewed together. FIG. 3A joins with FIG. 3B as indicated by connection point A2. First referring to FIG. 3B, operator station 300 includes operator station cellular router 370. As described above, operator station cellular router 370 is configured to wirelessly communicate with work station cellular router 270. Via high gain antennas 371 and 373, cellular router 370 transmits and receives data related to the operation of robot weld head 104 using a secure cellular network connection.

Operator station cellular router 370 communicates data related to robot weld head 104, robot controller 204, welding power supply 206, and headset 208 to fiber optic transmitter 360 via LAN connection 374. Signals are transmitted between operation station cellular router 370 and fiber optic transmitter 360 using an Ethernet protocol. Fiber optic transmitter 360 receives signals from cellular router 370 via Ethernet connection 366 and transmits those signals from single mode connection 364, via single mode fiber 345, to fiber optic receiver 340. Fiber optic receiver 340 receives the signals at single mode connection 344. Fiber optic transmitter 360 may include a video input 362 and Fiber optic receiver 340 may include a video input 342. Communication via single mode fiber 345 enables fiber optic transmitter 360 and operator station cellular router 370 to be at a location distant from other components of operator station 300. For example, operator console 310 may be beneficially located in an inside office while cellular router is placed at a distant location with stronger cellular signal compared to inside the office. In this example, single mode fiber 345 may extend up to approximately 2 miles in length without losing signal quality or speed.

Referring not to FIG. 3A and FIG. 3B, fiber optic receiver 340 converts signals received from fiber optic transmitter 360 back to an Ethernet format for further transmission to LAN router 330 via Ethernet connection 346. LAN router 330 is configured to route communication between different components of operator station 300 by detecting each component's individual IP address. LAN router 330 may be implemented using an UNMS EdgeRouter or similar Ethernet router technology. In the embodiment disclosed in FIG. 3A, LAN router 330 is configured to route Ethernet signals from fiber optic receiver 340 to video decoder 320 and operator console 310. In other embodiments, LAN router 330 may be configured to route Ethernet signals directly from operator station cellular router 370 to video decoder 320 and operator console 310.

The Ethernet signals routed to video decoder 320 carry data related to video signals generated by the one or more cameras included in robot weld head 104. Data related to audio captured by headset 208 is also routed to video decoder 320. As described above, in other embodiments, automated equipment other than robot weld head 104 may be implemented. Data related to video signals generated by one or more cameras included in this alternate automated equipment may also be routed to video decoder 320. Video decoder 320 receives these Ethernet signals at Ethernet LAN connection 326. The video data received by video decoder 320 is converted to high definition multimedia interface (HDMI) format and transmitted from HDMI connection 324 to operator console 310 via HDMI cable 313. The audio data received by video decoder is transmitted from audio connection 322 to headset 302.

Operator console 310 receives the video signal generated by the one or more cameras included in robot weld head 104. Video monitor 314 is included in operator console 310 and is configured to display one or more video images based on the video signal. This enables video monitor 314 to display a real time view of the welding process being executed by robot weld head 104. In other embodiments of the current disclosure, video monitor 314 displays one or more video images based on video signals generated by cameras included in automated equipment other than robot weld head 104. For example, video monitor 314 may display a real time video of automated equipment used in industrial processes for welding, painting, assembly, material handling, pick and place, packaging, labeling, palletizing, product inspection, testing, or other processes related to automated equipment.

The video displayed by video monitor 314 beneficially allows an operator stationed at operator console 310 to view various aspects of the process being executed by robot weld head 104 or other automated equipment in real time and to make decisions based on this view of the process. For example, robot weld head 104 may include one camera configured to monitor a leading edge of the weld puddle and another camera configured to monitor a trailing edge of the weld puddle. An operator looking at a real time view of these cameras is able to monitor the weld puddle, sidewall fusion, filler wire entry position and speed, and/or weld arc characteristics. Further, based on the real time video, the operator is able to identify where critical parameter adjustments controlling the filler wire feed rate, filler wire positioning, tungsten positioning, and/or the speed and positioning of the weld arm are needed in order to correct and improve the quality of the weld. The operator may also wear a headset 302 that receives audio from work station 200. Using headset 302, the operator is able to hear critical information about the process being executed at work station 200 and/or communicate with another operator located at work station 200 wearing headset 208.

Referring again to FIG. 3A, operator console 310 further includes human machine interface (HMI) 312. Operator console 310 receives the Ethernet signal routed by LAN router 330 that carries information related to the operations of robot weld head 104. This may include, for example, data related to robot weld head 104, robot controller 204, and welding power supply 206. This Ethernet signal is transmitted via Ethernet cable 311. In other embodiments of the current disclosure, operator console 310 receives an Ethernet signal routed by LAN router 330 that carries information related to automated equipment other than robot weld head 104. The HMI 312 included in operator console 310 enables an operator to interact with the system by monitoring and controlling operating parameters in order to modify the operations executed by robot weld head 104 or other automated equipment.

In various aspects of the current disclosure, HMI 312 may include a touchscreen and/or a joystick to facilitate operator control. In one exemplary canister welding process, the operator begins by selecting the specific type of welding operation to be performed using HMI 312. This causes automated programming associated with the selected welding operation to be loaded by, for example, robot controller 204 and/or operator console 310. Using HMI 312, the operator may also adjust various setup parameters based on the condition of the canister or the required welding specifications. Next, to initiate the welding process, the operator commands robot weld head 104 to move to a start position and begin welding. During welding, movements of robot weld head 104 are monitored by one or more cameras mounted to robot weld head 104 and displayed by video monitor 314 in real time. Using video monitor 314, the operator monitors weld puddle characteristics, sidewall fusion, and welding arc characteristics in order to make on-the-fly adjustments to operating parameters controlling the filler wire feed rate, filler wire positioning, tungsten positioning, and/or the speed and positioning of the weld arm, as needed.

The operator interaction described herein is critical to maintain weld quality. Moreover, operations controlled by the operator are not predetermined and require human monitoring and adjustment in order to achieve the desired weld characteristics. For example, the operator may adjust parameters related to the filler wire feed rate and/or positioning in order to control the filler wire entry into the weld puddle. The operator may also adjust parameters related to the tungsten positioning in order to control the weld arc and maintain certain characteristics that impact weld penetration and deposition. The operator may also adjust parameters related to the position and movement of the robot weld head 104 in order to steer a robot arm of robot weld head 104. The adjustments to parameters that control these operations may be made using the touchscreen and/or joystick included in HMI 312. In various embodiments, HMI 312 includes a remote, tactical, hand-held joystick or control pendant.

Operator console 310 may also be configured with biometric monitors or sensors. For example, in order for an operator to gain control over HMI 312, he or she may be required to unlock the system via facial recognition or fingerprint identification. Operator console 310 may also have a quality assurance/quality control (QA/QC) audit feature. For example, the operator's supervisor may be able to remotely view the operator's control selections in real time or based on stored data. This beneficially allows the supervisor to ensure that various operators at different locations are maintaining consistent quality. Also, the supervisor may be able to download weld schedules, error logs, and diagnostic information to assist with troubleshooting or performance management.

It should be noted that the communications described herein are sometimes referred to in the context of either transmitting or receiving a signal. However, these terms are not intended to limit the directionality of the communications. Throughout this disclosure, it should be understood that any component of work station 200 and operator station 300 that is described as transmitting a signal may also receive a signal. Similarly, any component of work station 200 and operator station 300 that is described as receiving a signal may also transmit a signal. For example, data related to the operation of robot weld head 104 is both transmitted and received by operator console 310. Similarly, data related to the operation of robot weld head 104 is both transmitted and received by PLC 210.

Various examples described above utilize wireless communications over a secure cellular network to transfer information between HMI 312, video monitor 314, PLC 210, robot weld head 104, robot controller 204, and welding power supply 206. This communication protocol enables what may be described as "man controlled automation" or "augmented automation"—the ability to operate complex equipment as an extension of human sensing and manipulating capability, allowing the operator to instantaneously or nearly instantaneously observe and make immediate adjustments and/or corrections to an otherwise automated process performing operations based on predetermined programming.

Moreover, various aspects of the present disclosure enable this type of augmented automation process to occur remotely through wireless communication. For example, an operator can remotely control an automated process that is being executed in a restricted area, such as welding the lid on a spent fuel canister in the containment building of a nuclear power plant, without having to be present onsite. Allowing this type of remote operation beneficially increases safety, efficiency, and has the potential for significant cost savings. A normal spent fuel canister welding operation may require a supervisor, two welding operators and a maintenance technician, all of whom would typically be required to be onsite. Implementing various aspects of the present disclosure, only one or two workers would be needed onsite to set up and maintain the equipment. The others could control the welding operations remotely, thereby saving the project several thousands of dollars in mobilization fees plus living expenses. Further, the various aspect of the present disclosure beneficially enable the remote control of automated processes without exposing operators to hazardous environments.

EXAMPLES

Various aspects of the subject matter described herein are set out in the following examples:

Example 1

A system for the remote control of automated equipment including: automated equipment configured to execute a process in a restricted location by performing operations based on predetermined programming; a first cellular router communicatively coupled to the automated equipment, wherein the first cellular router is located outside of the restricted location; a second cellular router configured to communicate with the first cellular router using a cellular network, wherein the second cellular router is located remotely from the first cellular router; an operator console communicatively coupled to the second cellular router, the operator console comprising a human machine interface (HMI) that enables an operator to modify the operations of the automated equipment in real time by changing operating parameters of the predetermined programming, wherein the changing of the operating parameters is communicated between the operator console and the automated equipment;

wherein a wireless signal cannot be transmitted from within the restricted location to outside of the restricted location.

Example 2

The system according to example 1 wherein the automated equipment comprises at least one camera configured to monitor the process and generate a video signal; and wherein the operator counsel comprises a video monitor that displays a real time view of the process based on the video signal, and wherein the real time view of the process is used by the operator to assist the operator when making decisions while changing the operating parameters.

Example 3

The system according to any of examples 1-2 further including: a programmable logic controller (PLC) communicatively coupled to the automated equipment, the PLC configured to enable communication of the operating parameters via ethernet; the PLC further comprising a video switcher communicatively coupled to the at least one camera, the video switcher configured to receive the video signal generated by the at least one camera; a video encoder communicatively coupled to the video switcher, the video encoder configured to receive the video signal from the video switcher and enable communication of the video signal via ethernet; a first LAN router communicatively coupled to the PLC, the video encoder, and the first cellular router, the first LAN router configured to route ethernet communications between the PLC, the video encoder, and the first cellular router; a second LAN router communicatively coupled to the second cellular router, the operator console, and a video decoder, the second LAN router configured to route ethernet communications between the second cellular router, the operator console, and the video decoder; wherein the video decoder is communicatively coupled to the video monitor, the video decoder configured to receive communication of the video signal from the second LAN router via ethernet and transmit the video signal to the video monitor via HDMI.

Example 4

The system according to any of examples 1-3 further including: a fiber optic receiver communicatively coupled to the first LAN router, the fiber optic receiver located within the restricted area; and a fiber optic transmitter communicatively coupled to the first cellular router, the fiber optic transmitter located outside of the restricted area; wherein the fiber optic receiver and the fiber optic transmitter enable communication from within the restricted area to outside of the restricted area via a fiber optic cable.

Example 5

The system according to any of examples 1-4 wherein the automated equipment comprises a robot weld head; and wherein the process is a welding process.

Example 6

The system according to any of examples 1-5 wherein the real time view of the process includes a view of a weld puddle.

Example 7

The system according to any of examples 1-6 wherein the operations modified by the operator include at least one of: manipulating a positioning of a weld wire to control a weld puddle; adjusting a feed rate of the weld wire to control the weld puddle; adjusting a tungsten positioning to control the welding arc; or steering the robot weld head.

Example 8

The system according to any of examples 1-7 wherein the welding process is welding a lid on a spent fuel canister; and wherein the restricted area is a containment building of a nuclear plant.

Example 9

The system according to any of examples 1-8 wherein the first cellular router and the second cellular router are further configured to detect multiple cellular networks; and wherein the first cellular router and the second cellular router automatically communicate using an alternate cellular network of the multiple cellular networks when there is a signal loss at either of the cellular routers.

Example 10

The system according to any of examples 1-9 wherein the automated equipment is configured to enter a safe state when there is a signal loss for all of the multiple cellular networks.

Example 11

A method for the remote control of automated equipment including: executing a process in a restricted location using automated equipment configured to perform operations based on predetermined programming; communicating operating parameters of the predetermined programming between an operating console and the automated equipment, the operating console comprising a Human Machine Interface (HMI); wherein a first cellular router is communicatively coupled to the automated equipment, the first cellular router located outside of the restricted location; wherein a second cellular router is communicatively coupled to the operating console, the second cellular router located remotely from the first cellular router; wherein a wireless signal cannot be transmitted from within the restricted location to outside of the restricted location; and wherein the first cellular router is configured to communicate with the second cellular router using a cellular network; and modifying, by an operator using the HMI, the operations of the automated equipment in real time by changing the operating parameters that are communicated between the operator console and the automated equipment.

Example 12

The method according to example 11, further including: monitoring the process in the restricted location using at least one camera comprised in the automated equipment and generating a video signal based on the monitored process; and displaying a real time view of the process on a video monitor comprised in the operator console based on the video signal; wherein the real time view of the process is used by the operator to assist the operator when making decisions while changing the operating parameters.

Example 13

The method according to examples 11 or 12 further including: communicating the operating parameters between a PLC console and a first LAN router, wherein the PLC console is communicatively coupled to the automated equipment, the PLC configured to enable communication of the operating parameters via ethernet; receiving, by a video switcher comprised in the PLC, the video signal from the at least one camera and transmitting, by the video switcher, the video signal to a video encoder; transmitting, by the video encoder, the video signal to the first LAN router, the video encoder configured to enable communication of the video signal via ethernet; routing, by the first LAN router, ethernet communications between the PLC, the video encoder, and the first cellular router; routing, by a second LAN router, ethernet communications between the second cellular router, the operator console, and a video decoder; receiving, by the video decoder, the video signal via ethernet and transmitting, by the video decoder, the video signal to the video monitor via HDMI.

Example 14

The method according to any of examples 11-13 further including: communicating from within the restricted area to outside of the restricted area via a fiber optic cable; wherein a fiber optic receiver is communicatively coupled to the first LAN router, the fiber optic receiver located within the restricted area; and wherein a fiber optic transmitter is communicatively coupled to the first cellular router, the fiber optic transmitter located outside of the restricted area.

Example 15

The method according to any of examples 11-14 wherein the automated equipment comprises a robot weld head; and wherein the process is a welding process.

Example 16

The method according to any of examples 11-15 wherein the real time view of the process includes a view of a weld puddle.

Example 17

The method according to any of examples 11-16 wherein modifying the operations of the automated equipment includes at least one of: manipulating a positioning of a weld wire to control a weld puddle; adjusting a feed rate of the weld wire to control the weld puddle; adjusting a tungsten positioning to control the welding arc; or steering the robot weld head.

Example 18

The method according to any of examples 11-17 wherein the welding process is welding a lid on a spent fuel canister; and wherein the restricted area is a containment building of a nuclear plant.

Example 19

The method according to any of examples 11-18 further including: detecting, by the first cellular router and the second cellular router, multiple cellular networks; and automatically communicating using an alternate cellular network of the multiple cellular networks when there is a signal loss at either of the cellular routers.

Example 20

The method according to any of examples 11-19 further including: causing the automated equipment to enter a safe state when there is a signal loss for all of the multiple cellular networks.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present disclosure has been described with reference to various exemplary and illustrative aspects. The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications or combinations of any of the exemplary aspects may be made without departing from the scope of the present disclosure. In addition, persons skilled in the art will recognize, or be able to ascertain using no more than routine experimentation, many equivalents to the various aspects of the present disclosure upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A system for the remote control of automated equipment comprising:
   automated equipment configured to execute a process in a nuclear containment building by performing operations based on predetermined programming;
   a first cellular router communicatively coupled to the automated equipment, wherein the first cellular router is located outside of the nuclear containment building;
   a second cellular router configured to communicate with the first cellular router using a cellular network, wherein the second cellular router is located remotely from the first cellular router, and wherein the first cellular router and the second cellular router are configured to detect multiple cellular networks; and
   an operator console communicatively coupled to the second cellular router, the operator console comprising a human machine interface (HMI) that enables an operator to modify the operations of the automated equipment in real time by changing operating parameters of the predetermined programming, wherein the changing the of the operating parameters is communicated between the operator console and the automated equipment;
   wherein the nuclear containment building comprises a structure that prevents transmission of a wireless signal from within the nuclear containment building to outside of the nuclear containment building;
   wherein the first cellular router and the second cellular router automatically communicate using an alternate cellular network of the multiple cellular networks when there is a signal loss at either of the cellular routers; and
   wherein the automated equipment is configured to enter a safe state when there is a signal loss for all of the multiple cellular networks.

2. The system of claim 1 wherein the automated equipment comprises at least one camera configured to monitor the process and generate a video signal; and
   wherein the operator counsel comprises a video monitor that displays a real time view of the process based on the video signal, and wherein the real time view of the process is used by the operator to assist the operator when making decisions while changing the operating parameters.

3. The system of claim 2 further comprising:
   a programmable logic controller (PLC) communicatively coupled to the automated equipment, the PLC configured to enable communication of the operating parameters via ethernet; the PLC further comprising a video switcher communicatively coupled to the at least one camera, the video switcher configured to receive the video signal generated by the at least one camera;
   a video encoder communicatively coupled to the video switcher, the video encoder configured to receive the video signal from the video switcher and enable communication of the video signal via ethernet;
   a first LAN router communicatively coupled to the PLC, the video encoder, and the first cellular router, the first LAN router configured to route ethernet communications between the PLC, the video encoder, and the first cellular router;
   a second LAN router communicatively coupled to the second cellular router, the operator console, and a video decoder, the second LAN router configured to route ethernet communications between the second cellular router, the operator console, and the video decoder;
   wherein the video decoder is communicatively coupled to the video monitor, the video decoder configured to receive communication of the video signal from the second LAN router via ethernet and transmit the video signal to the video monitor via HDMI.

4. The system of claim 3 further comprising:
   a fiber optic receiver communicatively coupled to the first LAN router, the fiber optic receiver located within the nuclear containment building; and
   a fiber optic transmitter communicatively coupled to the first cellular router, the fiber optic transmitter located outside of the nuclear containment building;
   wherein the fiber optic receiver and the fiber optic transmitter enable communication from within the nuclear containment building to outside of the nuclear containment building via a fiber optic cable.

5. The system of claim 2 wherein the automated equipment comprises a robot weld head; and wherein the process is a welding process.

6. The system of claim 5 wherein the real time view of the process includes a view of a weld puddle.

7. The system of claim 6 wherein the operations modified by the operator include at least one of:
   manipulating a positioning of a weld wire to control a weld puddle;
   adjusting a feed rate of the weld wire to control the weld puddle;
   adjusting a tungsten positioning to control the welding arc; or steering the robot weld head.

8. The system of claim 5 wherein the welding process is welding a lid on a spent fuel canister.

9. A method for the remote control of automated equipment comprising:
   executing a process in a nuclear containment building using automated equipment configured to perform operations based on predetermined programming;
   communicating operating parameters of the predetermined programming between an operating console and the automated equipment, the operating console comprising a Human Machine Interface (HMI);
   wherein a first cellular router is communicatively coupled to the automated equipment, the first cellular router located outside of the nuclear containment building;
   wherein a second cellular router is communicatively coupled to the operating console, the second cellular router located remotely from the first cellular router;
   wherein the nuclear containment building comprises a structure that prevents transmission of a wireless signal from within the nuclear containment building to outside of the nuclear containment building;
   wherein the first cellular router is configured to communicate with the second cellular router using a cellular network;
   modifying, by an operator using the HMI, the operations of the automated equipment in real time by changing the operating parameters that are communicated between the operator console and the automated equipment
   detecting, by the first cellular router and the second cellular router, multiple cellular networks;
   automatically communicating using an alternate cellular network of the multiple cellular networks when there is a signal loss at either of the cellular routers; and
   causing the automated equipment to enter a safe state when there is a signal loss for all of the multiple cellular networks.

10. The method of claim 9 further comprising:
monitoring the process in the nuclear containment building using at least one camera comprised in the automated equipment and generating a video signal based on the monitored process; and
displaying a real time view of the process on a video monitor comprised in the operator console based on the video signal;
wherein the real time view of the process is used by the operator to assist the operator when making decisions while changing the operating parameters.

11. The method of claim 10 further comprising:
communicating the operating parameters between a PLC console and a first LAN router, wherein the PLC console is communicatively coupled to the automated equipment, the PLC configured to enable communication of the operating parameters via ethernet;
receiving, by a video switcher comprised in the PLC, the video signal from the at least one camera and transmitting, by the video switcher, the video signal to a video encoder;
transmitting, by the video encoder, the video signal to the first LAN router, the video encoder configured to enable communication of the video signal via ethernet;
routing, by the first LAN router, ethernet communications between the PLC, the video encoder, and the first cellular router;
routing, by a second LAN router, ethernet communications between the second cellular router, the operator console, and a video decoder;
receiving, by the video decoder, the video signal via ethernet and transmitting, by the video decoder, the video signal to the video monitor via HDMI.

12. The method of claim 11 further comprising communicating from within the nuclear containment building to outside of the nuclear containment building via a fiber optic cable;
wherein a fiber optic receiver is communicatively coupled to the first LAN router, the fiber optic receiver located within the nuclear containment building; and
wherein a fiber optic transmitter is communicatively coupled to the first cellular router, the fiber optic transmitter located outside of the nuclear containment building.

13. The method of claim 10 wherein the automated equipment comprises a robot weld head; and wherein the process is a welding process.

14. The method of claim 13 wherein the real time view of the process includes a view of a weld puddle.

15. The method of claim 14 wherein modifying the operations of the automated equipment includes at least one of:
manipulating a positioning of a weld wire to control a weld puddle;
adjusting a feed rate of the weld wire to control the weld puddle;
adjusting a tungsten positioning to control the welding arc; or
steering the robot weld head.

16. The method of claim 13 wherein the welding process is welding a lid on a spent fuel canister.

* * * * *